United States Patent
Grott

(10) Patent No.: US 7,947,185 B2
(45) Date of Patent: May 24, 2011

(54) WATER SANITATION METHODS

(76) Inventor: Gerald J. Grott, Phoenix, AZ (US)

( * ) Notice: Subject to any disclaimer, the term of this patent is extended or adjusted under 35 U.S.C. 154(b) by 818 days.

(21) Appl. No.: 11/978,890

(22) Filed: Oct. 30, 2007

(65) Prior Publication Data
US 2008/0164218 A1    Jul. 10, 2008

Related U.S. Application Data

(63) Continuation-in-part of application No. 10/706,341, filed on Nov. 11, 2003, now Pat. No. 7,353,634, which is a continuation-in-part of application No. 09/849,453, filed on May 4, 2001, now Pat. No. 6,651,383, which is a continuation-in-part of application No. 09/565,735, filed on May 5, 2000, now Pat. No. 6,374,539, which is a continuation-in-part of application No. 09/110,789, filed on Jul. 6, 1998, now Pat. No. 6,071,411.

(51) Int. Cl.
*C02F 1/46* (2006.01)
*C02F 1/461* (2006.01)

(52) U.S. Cl. ............. 210/748.01; 422/22; 422/186.04; 210/748.2

(58) Field of Classification Search .......... 210/638, 210/681, 683, 685, 687, 748.01–748.1, 748.2; 422/20, 22, 24, 186, 186.3
See application file for complete search history.

(56) References Cited

U.S. PATENT DOCUMENTS

| | | | |
|---|---|---|---|
| 3,077,054 A | 2/1963 | Niemijer | |
| 3,224,867 A | 12/1965 | Milloch | |
| 3,331,207 A | 7/1967 | McGraw | |
| 3,617,554 A | 11/1971 | Thorborg | |
| 5,125,770 A | 6/1992 | Hessling | |
| 5,300,123 A | 4/1994 | Grott | |
| 6,132,627 A * | 10/2000 | Joko et al. | 210/748.2 |
| 7,622,044 B2 * | 11/2009 | Grott | 210/638 |
| 2002/0104804 A1 | 8/2002 | Grott | |

FOREIGN PATENT DOCUMENTS
WO    WO 98/06483    2/1998

OTHER PUBLICATIONS

Robert C. Cooper, Public Health Concerns in Wastewater Re-use, Wat. Sci. Tech., vol. 24, No. 9, p. 55-65, 1991.
Terrence J. McManus P.E., Re-use of Agricultural Wastewaters from Power Plant Cooling One-year Pilot Plant Experience (XP-001030054).
R.J. Bull, FC. Kopfler RJ. Toxicological Evaluation of Risks Associated with Portable Re-use of Wastewater, p. 2176-2194.
Mark Schonbeck, "Does My Soil Need Cation Nutriends Balancing?" A Practical Guide to Nutrition for Soil Crops, Downloaded from the web on Sep. 27, 2004.

(Continued)

*Primary Examiner* — Walter D Griffin
*Assistant Examiner* — Cameron J Allen
(74) *Attorney, Agent, or Firm* — Sinorica, LLC

(57) ABSTRACT

Suspect contaminated water is sanitized by treating it to produce a clean water stream and a waste water stream. A portion of the waste water stream is electrolyzed to provide a solution containing hypochlorite ions, a quantity of which is mixed with the suspect water in sufficient quantity to sanitize the suspect water and maintain sufficient residual chlorine to prevent re-contamination.

1 Claim, 3 Drawing Sheets

OTHER PUBLICATIONS

Marvin Fleischman, Re-use of Wastewater Effluent as Cooling Tower Make-up Water, p. 501-514.
Edited by Robert A. Wright, The Reclamatin of Disturbed Arid Lands, University of New Mexico, Alburquerque.
Lisa Lieberman, Recycled Wastewater Used to Irrigate Crops in California, The Vegetable Growers News, 2003, Great American Publishing.
Minerva Canto, Wetlands to be Protected, The West, Printed Sep. 27, 2001, L.A. Times, Los Angeles, CA.
Ken Ellingwood, EPA to Rule on Imperial County's Dusty Air Quality, The State, L.A. Times, Nov. 1, 2001, Los Angeles, CA.
G.J. Grott, "Do-It-Yourself" Liquid Clorine Bleach for Rural Sanitation, Presented at the 3rd NFS International Symposium on Small Drinking Water and Wastewater Systems, Apr. 2001.
Edited by Rob M. Geertman, Changing Waste Irrigation Waters from Pollutant to Beneficial Products, 8th World Salt Symposium, vol. 1, 2000.
H. Clark Metcalfe, Modern Chemistry, 1986, p. 347-351, 2nd Addition, Holt McDougal.
Glossary of Terms Used in Physical Organic Chemistry (IUPAC Recommendations 1994), downloaded from web Jan. 22, 2003.
Environmental Help Line, Downloaded from web on Apr. 8, 2003.
Salinity, downloaded from web on Apr. 8, 2003.
Terry Plane, Salinity Threat to Drinking Water, Jan. 22, 2003, Downloaded from web on Apr. 8, 2003.
Bettina Boxall, Salton Sea Plan Proposed, L.A. Times News Paper, May 12, 2003. Los Angeles, CA.
B.D. Seeling (Soil Scientist), Salinity & Sodicity in North Dakota Soils, May 2003.
Thomas E. Huggler, Cannon's Guide to Freshwater Fishing with Downriggers, Nov. 1986.
N.A. Wynhausen, Ion Exchange Regeneration for the Soft Water Service Industry, Reprinted from a series by Mr. Wynhausen, Published in "Water Condidtion and Purifcation Mag".
J.R. Griffin, J.C. Silvertooth, E.R. Norton, Evaluation of Calcium Soil Conditioners in an Irrigated Cottong Production System, 1997, downloaded from web Mar. 31, 2000.

* cited by examiner

WATER SANITATION METHODS

RELATED APPLICATIONS

This application is a continuation-in-part of my application U.S. Ser. No. 10/706,341 filed Nov. 11, 2003 now U.S. Pat. No. 7,353,634, which is, in turn, a continuation-in-part of my application U.S. Ser. No. 09/849,453, filed May 4, 2001, now U.S. Pat. No. 6,651,383 issued Nov. 25, 2003, which is, in turn, a continuation-in-part of my application U.S. Ser. No. 09/565,735 filed May 5, 2000, now U.S. Pat. No. 6,374,539 issued Apr. 23, 2002, which is in turn, a continuation-in-part of my application U.S. Ser. No. 09/110,789 filed Jul. 6, 1998, now U.S. Pat. No. 6,071,411 issued Jun. 6, 2000.

FIELD OF THE INVENTION

The present invention relates to sanitation methods.

More particularly, the invention concerns sanitation methods using disinfectants manufactured from waste waters.

In another respect the invention concerns sanitation methods which are inexpensive and easily practiced by inexperienced persons, using readily available materials and simple apparatus.

These and other, further and more specific objects and advantages of the invention will be apparent to those skilled in the art from the following detailed description taken in conjunction with the drawings, in which:

BACKGROUND OF THE INVENTION

Figure 1:
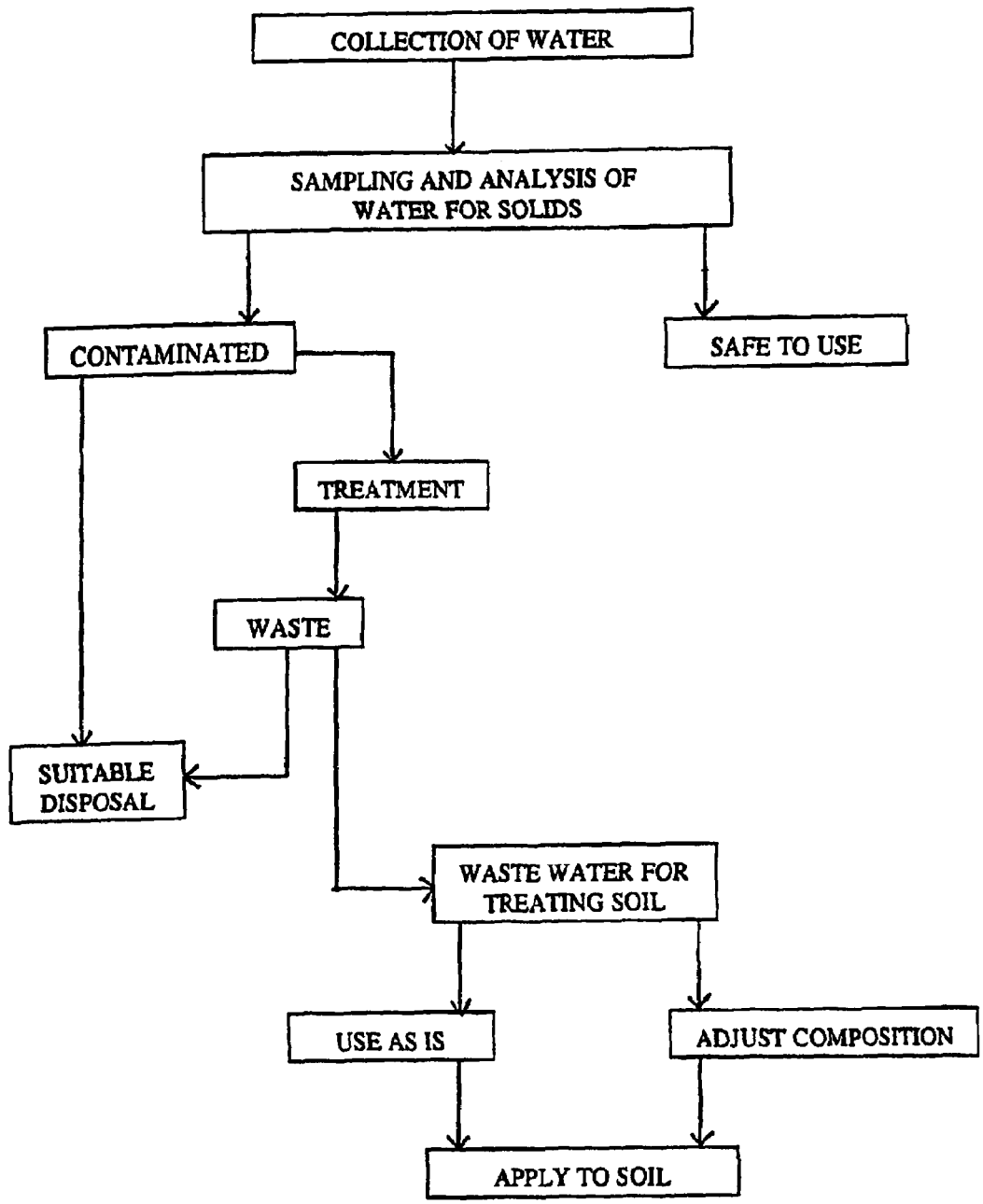
FIG. 1 is a flow chart of the preferred method of the invention for initial refining of waste waters to separate and provide a clean water stream and a contaminated water stream.

Water purification typically produces a first effluent of relatively "clean water" and a second effluent of "waste water" which includes unwanted contaminants.

For example, the softening of hard water by the removal of calcium and magnesium is required for both industrial and household use. Known water softening processes proceed either by way of ion-exchange, membrane softening or precipitation. In the ion-exchange processes, the calcium (Ca++) and magnesium (Mg+) ions are exchanged for sodium (Na+) ions. Regeneration of the ion-exchange resin is achieved with a large excess of NaCl. This processes creates a regeneration effluent being a relatively concentrated aqueous solution of sodium, calcium and magnesium chlorides. Consequently, by this method, considerable amounts of sodium, calcium and magnesium salts in solution must be disposed of.

Alternatively, it is possible to use weak acid resins which exchange hydrogen (H+) for calcium (Ca++) and magnesium (Mg++) ions, and to regenerate the spent resins with a mineral acid. While this method creates less waste water, it is more expensive and yields relatively acidic soft water which is corrosive.

Membrane softening concentrates the calcium, magnesium salts and salts of other divalent ions to produce waste waters which require costly disposal.

The precipitation process has traditionally been carried out by the "lime soda" process in which lime is added to hard water to convert water soluble calcium bicarbonate into water insoluble calcium carbonate. This results in waste water which is difficult to filter and requires use of cumbersome equipment.

It would be desirable if such waste waters could be processed to provide disinfectant products and methods of sanitation.

It would be even more desirable to provide methods of making disinfectant products from waste waters in underdeveloped countries.

BRIEF DESCRIPTION OF THE INVENTION

Briefly, in accordance with the invention, I provide methods for sanitizing suspect water comprising in combination the steps of treating contaminated water to produce a clean water stream and a waste water stream, electrolyzing a portion of the waste water to provide a solution containing hypochlorite ions and mixing the hypochlorite solution with the suspect water in sufficient quantity to sanitize the suspect water and maintain sufficient residual chlorine to prevent re-contamination.

As defined herein, clean water refers to water which has been treated by one or several methods for public or industrial use. For example, in the drinking water industry, clean water is the final delivered water. Typical water purification processes and water softening processes create waste water having various levels of salt content. For the purposes of this invention, I define "waste water" as water containing about 0.15% or more by weight of the salts of Na, K, Ca, Mg, Fe, Cl, SO4, and CO3 or a combination thereof.

DETAILED DESCRIPTION OF THE PREFERRED EMBODIMENTS

Water softening is the removal of the "hardness" from the water which means predominantly removing or altering the calcium and magnesium ions from the water. These calcium and magnesium ions combine with carbonates, sulfates, oils and fat to create bathtub scum, spotted dishes, gray sheets, etc. In addition, unsoftened water causes scaling in water heaters and boilers, causing early substantial energy losses through impaired heat transfer and early shutdown for the removal of scale.

Several methods for effecting water softening are known. The best known process for softening water is "ion-exchange". Ion-exchange entails the exchange of sodium, which is introduced into water, for calcium, magnesium, iron and other divalent mineral ions which are transferred out of the water and into a resin. When the resin approaches saturation with these "hard" ions, the resin is regenerated most often with solutions of sodium chloride leaving an effluent containing 3 to 25% sodium, calcium and magnesium salts which must be disposed of.

The exact concentration of the effluent depends on the shop practice and, in particular, on the amount of rinse water included in the effluent, if any. Less often mineral acids like sulfuric acid or hydrochloric acid are used for water softening and these also produce effluents. Conversely, reverse water softening also involves ion exchange in which calcium and magnesium are introduced into the water to separate sodium.

Membrane systems have recently become economically feasible. These systems, such as electro dialysis and reverse osmosis, include the use of a membrane which also produces a salty effluent. For critical uses such as electronics, and particularly for use in the manufacture of computer chips, the first product of clean water may be further purified by dual bed or mixed bed ion-exchange treatment. This "polishing treatment" also produces an effluent containing the removed salts.

As shown in FIG. 1, each of these water purifying processes produce a clean water effluent and a waste water effluent which is expensive and difficult to dispose of, contaminated with salts including Na, K, Ca, Mg, Fe, Cl, SO4 and CO3. The contaminated water is purified by any means known to those skilled in the art, including distillation, reverse osmosis, electrolysis, evaporation, ion exchange, etc. The contaminated water is processed to produce a first effluent of relatively clean water which is useful for agricultural purposes, drinking water, industrial purposes, etc. The processing also produces a second effluent of waste water. The waste water is analyzed for hazardous materials to confirm that the waste water is safe to use. Thereafter, the waste water, comprising an aqueous solution of salts, is analyzed for individual amounts of sodium, calcium, and magnesium and total dissolved solids.

Figure 2:
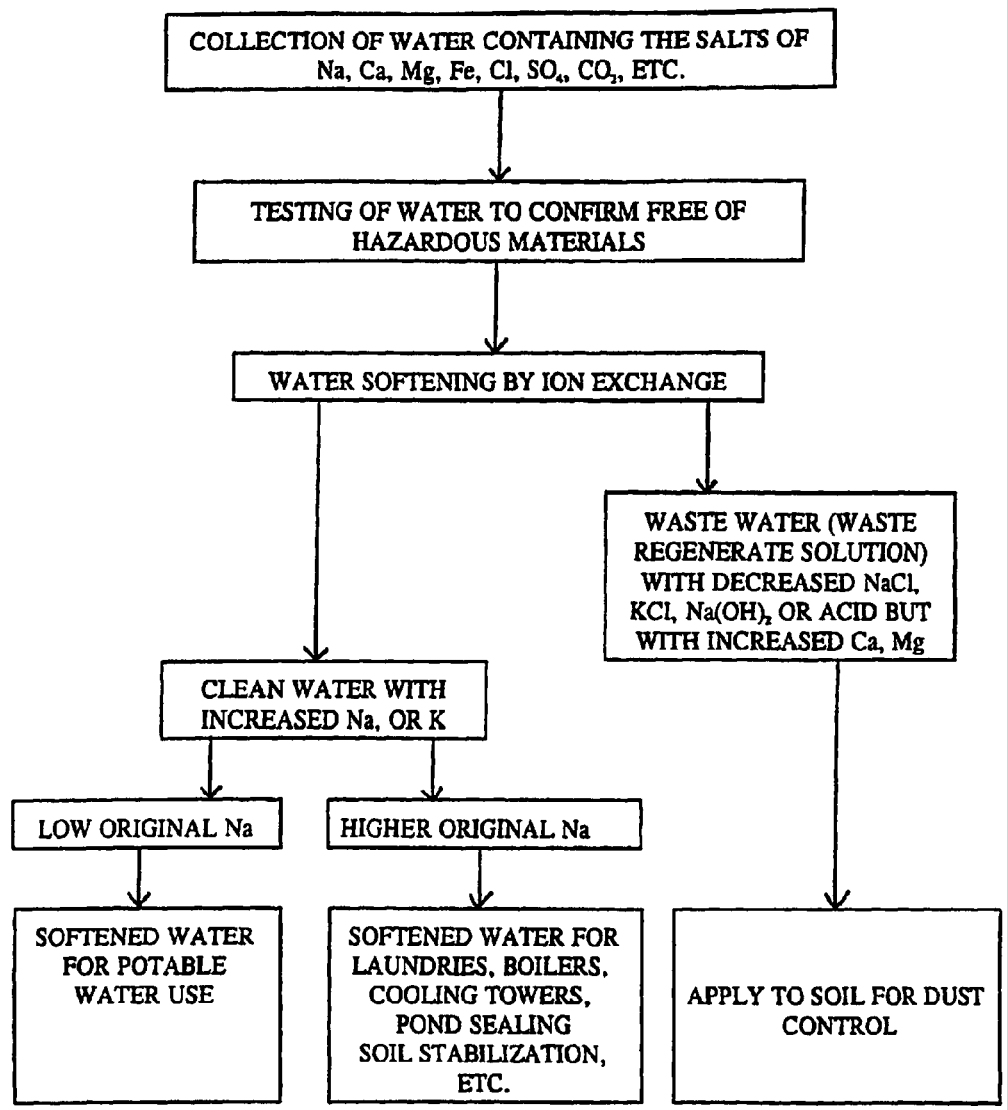
FIG. 2 is a flow chart of another preferred method of the invention for initial refining of waste waters to separate and provide a clean water stream and a contaminated water stream.

With reference to FIG. 2, in a second preferred embodiment, water is collected which is contaminated with the salts of Na, Ca, Mg, Fe, Cl, SO4, and CO3. The water is then tested to confirm that it is free of hazardous materials. The contaminated water is then purified by ion exchange. As the name implies, the amount of salts in the effluents does not change. However, the cations are exchanged. By this process, a first effluent of clean water is produced having increased sodium or potassium. Where the contaminated water originally contained a low amount of sodium, it is preferred that this water be used for potable water. Where the contaminated water originally contained high sodium amounts, it is preferred that the clean water effluent be used for laundries, boilers, cooling towers, pond sealing and soil stabilization. These applications are typically more tolerant of waters having high sodium content, as long as the magnesium and calcium content remains low. These uses are listed in order of suitability as the sodium increases.

Figure 3:
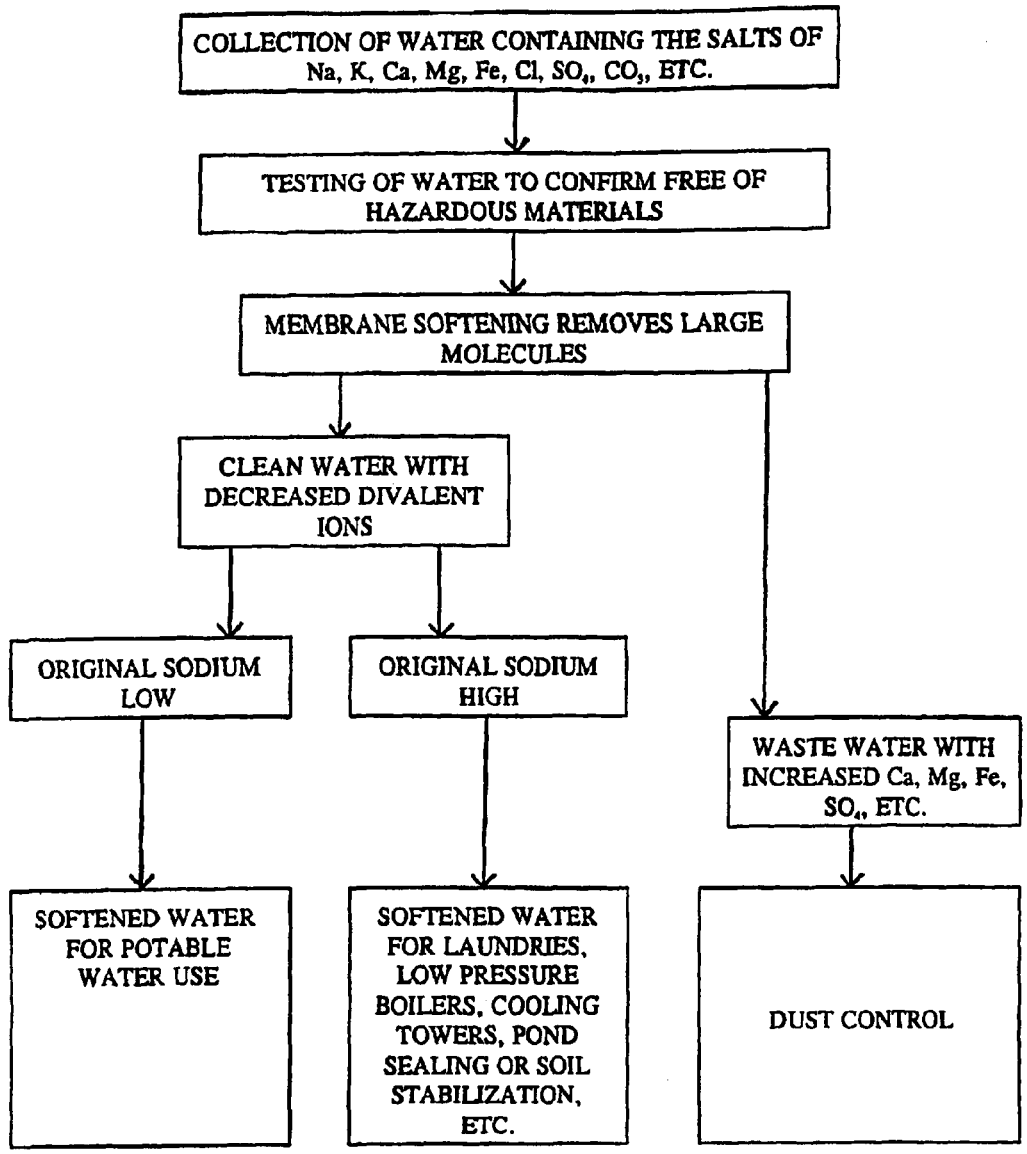
FIG. 3 is a flow chart of still another preferred method of the invention for initial refining of waste waters to separate and provide a clean water stream and a contaminated water stream.

With reference to FIG. 3, in a third preferred embodiment, water is collected which is contaminated with the salts of Na, K, Ca, Mg, Fe, Cl, SO4, and CO3. The water is then tested to confirm that it is free of hazardous materials. This contaminated water is then purified by a membrane system to remove large molecules. A first effluent of clean water having decreased multivalent ions is produced from the membrane softening process. Where the original sodium content of the contaminated water is relatively low, it is preferred that the clean water be used for potable water. Where the original sodium content of the contaminated water is relatively high, it is preferred that the clean water effluent be used for laundries, low pressure boilers, cooling towers, pond sealing and soil stabilization. The membrane system also creates a waste water having significant calcium, magnesium, iron, sulfates, etc.

EXAMPLE

A sample of the salt recovered from the Salton Sea was used to make a solution containing about 1% sodium chloride. This solution was used to make a weak, less than 1% chlorine, sodium hypochlorite bleach according to the method of Grott, as depicted, for example at applicant's website <www.waterpot.org>.

Though undesirable impurities like boron are present, the percentages are so reduced according to the 2-5 ppm use of the chlorine in the hypochlorite solution that using it for sanitation of water for cleaning of home surfaces, eating and cooking utensils, clothes and bedding is safe.

Much of the world's population depends on boiling to produce safe drinking water but the first utensil dipped into the cooled water may re-contaminate it, and the water will no longer be "safe to drink". Solar heat and other practices may also be used for killing parasites and germs but the problem of re-contamination remains. Chlorine is the only practical means for extending the period of safety of the drinking water.

Many plants and vegetables must be cooked to prevent illness when they could be made safe to eat simply by washing with chlorinated water. Just like the drinking water, cooked foods, after cooling, can be re-contaminated by use of serving utensils that were not sanitized.

Chlorine is a common agent for sanitizing water and residual chlorine adds a measure of lasting protection to the treated water.

Handling dilute hypochlorite solutions, even with chlorine concentrations below 1%, requires caution, eye protection is advised, and drinking the bleach itself is very dangerous. Use of bleach in sanitizing water containing organic materials is reported to increase the risk of cancer in humans by up to 10 chances per million.

The objective is to have equipment and operations requiring skills comparable with those of bicycle and auto mechanics, and to use commonly available materials to the full extent possible. Cell dimensions are matched to the capabilities of a 12-volt car battery. Sodium hypochlorite forms when salt water is electrolyzed using direct current. The theoretical voltage drop across a single cell is below 3 volts but in operation it is about 3.3 to 4.0 volts depending on resistance losses in the wires and electrodes, the salt concentration and temperature of the solution, and the spacing of the electrodes.

The 10-12 volt drop for a 3-cell electrolysis unit fits well with the 12 volt D.C. battery typically used in cars. Car batteries are charged (recharged) using a source of DC power at about 14 volts. Battery chargers converting AC to DC are common, and there are also solar cell chargers. For a true "do-it-yourself" power unit one can chose to use a car alternator, or generator, and to drive it by a V-belt using the driving wheel on a bicycle. The rate of rotation of the bicycle wheel is matched to the characteristics of a particular alternator or generator. A typical alternator from a mid-sized American car will produce about 7 amperes at 1500 revolutions per minute (rpm) and the power output increases as the rpm are increased. The size of the pulley used on the alternator is chosen to meet the preference of the bicycler to produce the necessary 1500-2000 rpm. Charging to maintain battery capacity is usually carried out during the bleach making so as to avoid drawing the battery down below the full 12 volts operating capability.

Alternators require voltage regulation and may have a built-in voltage regulator or they may require a separate one. Generators require a separate voltage regulator. Producing the 7-10 amps at 14 volts common for battery chargers is well within the comfort range for even lightly built teenagers. Producing a charger output of 7-10 amperes feels comparable to pumping a bicycle on level pavement at about 12-15 miles per hour. Geared bicycle drives allow adjusting the pedaling rpm to an individual's comfort range. In the USA, the cost for all components, including a rebuilt alternator, a voltage regulator, V-belt, and used bicycle components is on the order of $100-$150 per charging unit.

Graphite and/or titanium were chosen for the electrodes because of their known properties, availability, and acceptable costs. Commercial electrolysis units commonly use plated titanium to allow long use before maintenance or replacement is required. This extra expense for coating is not cost effective where labor costs are low and there is a need for rural water sanitation.

An assembly of four electrodes is clamped with the faces parallel. Plastic strips that do not conduct electricity, and about 2.5 wide×7.5 cm long×6 mm thick, are placed at the top of the electrode assembly to provide a 6 mm spacing between electrodes. A 3 cell unit with a voltage drop of 10-12 volts is formed by clamping 4 electrodes with 6 mm spacing between the faces. Power is supplied only to the outside electrodes with the two inner electrodes providing two working surfaces each.

Electrode dimensions of 7.5 cm×15 cm were chosen to fit the power output ranges of different size batteries. For this assembly, the amperage required by the cell can be adjusted by the depth of immersion of the electrodes. Immersion to 7.5 cm in a 1% salt solution typically draws 7-10 amperes. Of course, changing the salt content of the solution also changes the electric characteristics of the hypochlorite generator.

The container can be any glass or plastic. A 2-liter plastic soft drink bottle works well. A working capacity of about 1.5 liters is available when the bottle top is cut off just above the label. Active chlorine produced depends on the power source, the strength of the salt solution, and the time period during which power is applied to the cell. The hourly chlorine production can be varied within the range of 600-6000 PPM. Even the lower concentration is enough to sanitize and protect several hundred liters of drinking water. Experience with this simple unit has demonstrated that making usable solutions of bleach is well within the capability of persons having only very basic technical expertise.

For use in sanitizing water, instrumentation for testing for residual chlorine is of great help. In the absence of such instrumentation and skills, another way is available. For water sanitation, one typically adds so many drops of hypochlorite solution to a gallon of water, waits 30 minutes, and smells the water. If the bleach is detectable by smell, then there is enough residual chlorine that bacteria in the water were killed. (Parasites must be filtered out or killed by pasteurization or boiling, for example by simple slow sand filtration.) If the smell is too strong, dilute the treated water by a measured amount, mix, wait 30 minutes, and try the smell again. If there is no chlorine smell, add another measured amount of the bleach, mix, wait another 30 minutes and test by smell.

This trial procedure establishes a safe level by experience without the use of instrumentation or test kits, and even when the initial strength of the bleach is not known. It is tedious and boring at any time and can be very irritating if one is thirsty, but it works. When, after that 30-minute wait period, the residual chlorine is detected by smell, then there is enough residual chlorine to give all of the sanitation benefits required.

Having described my invention in such terms as to enable one in the art to understand and practice it and, having identified the presently preferred embodiments thereof, I claim:

1. A method for sanitizing suspect water comprising:
   (a) treating contaminated water to produce a clean water stream and a waste water stream;
   (b) electrolyzing a portion of said waste water to provide a solution containing hypochlorite ions; and
   (c) mixing said hypochlorite solution with a quantity of said suspect water in sufficient quantity to sanitize said suspect water and maintain sufficient residual chlorine to prevent re-contamination.

\* \* \* \* \*